United States Patent Office 3,041,666
Patented July 3, 1962

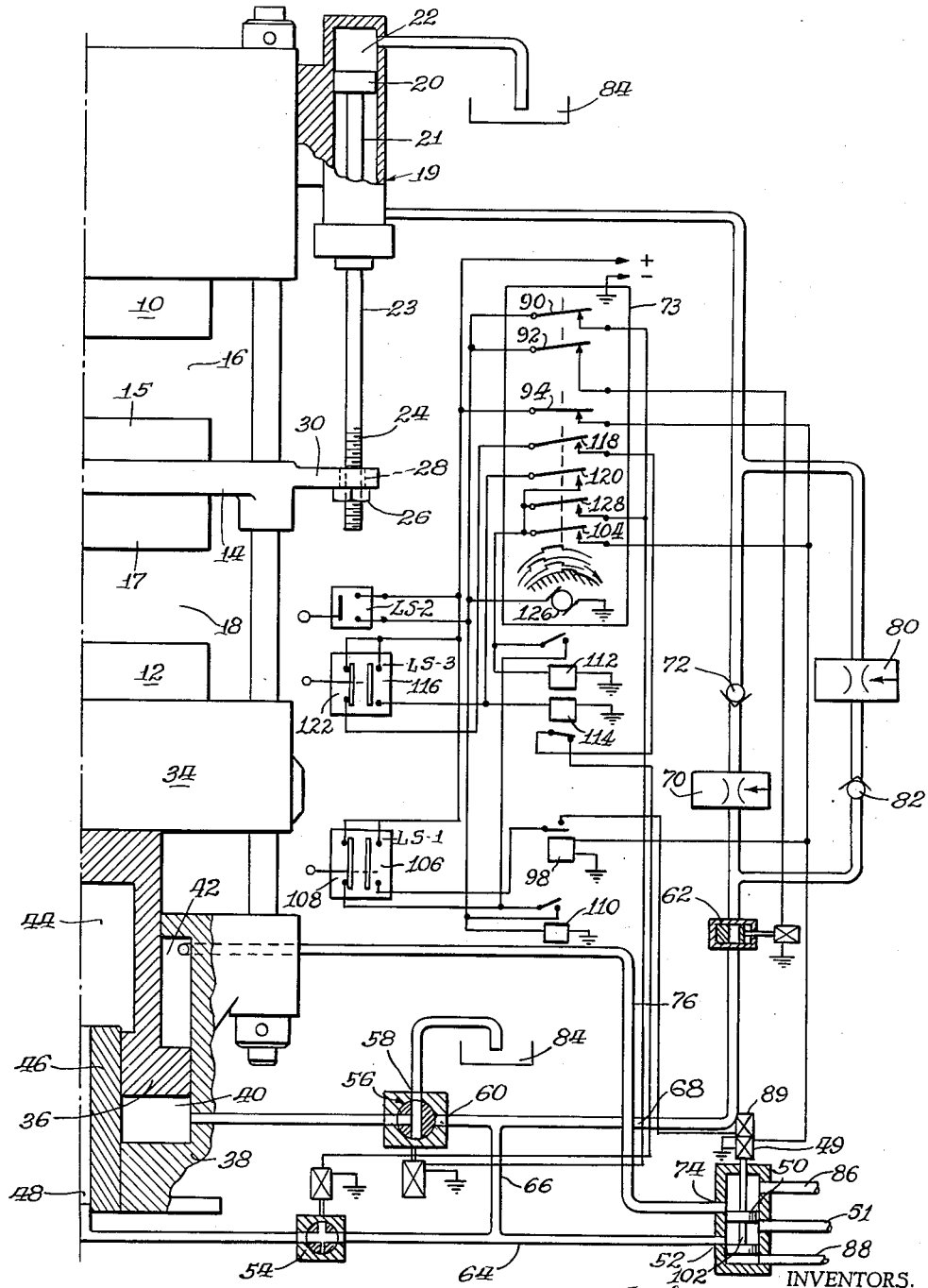

3,041,666
MULTIPLE OPENING HOT PLATE PRESS
Richard E. Dorenbos, Greenhills, and Joseph W. Tomka, Cincinnati, Ohio, assignors, by mesne assignments, to Nordberg Manufacturing Company, a corporation of Wisconsin
Filed Jan. 20, 1959, Ser. No. 787,970
8 Claims. (Cl. 18—17)

This invention relates to multiple opening hot plate presses and to their manner of operation.

A multiple opening hot plate press generally includes a stationary top platen including a top die and a movable bottom platen including a bottom die. Positioned between the top and bottom platens is an intermediate platen having an upwardly facing die which together with the top die constitutes an upper mold, and also having a downwardly facing die which together with the movable bottom die constitutes a lower mold. A multiple opening press could, or course, comprise more than two molds, but the most common type generally utilizes only the two molds as described above.

Prior art multiple opening presses are operated by urging the movable bottom platen upwardly until the lower mold is completely closed. The intermediate platen is then picked up by the bottom platen and moved upwardly until the upper mold is closed. In order to vent the molds, which is invariably necessary in operating hot plate presses, it is sufficient to open each of the molds only about one-quarter of an inch. However, this cannot be accomplished on prior art presses. In these arrangements, after the molds have been closed and venting is required, the platen lifting means, usually hydraulic, is reversed whereupon the bottom and intermediate platens move down as a unit. This of course opens the upper mold for venting, but obviously, because the bottom platen carries the intermediate platen, the upper mold must be opened completely before the bottom mold can be opened the necessary quarter inch. After venting, the bottom platen once again picks up the intermediate platen and moves it all the way to closed position so that the curing portion of the press cycle may take place. This venting procedure obviously adds appreciable time and cost to press operations.

A primary object of the present invention, therefore, is to provide an arrangement for more efficiently controlling the cycle of operation of a multiple opening hot plate press. A more specific object is to provide an arrangement for increasing the speed of operation of such a press and thereby provide a higher productive rate without an increase in production costs.

The objects of the invention are accomplished by the provision of an arrangement wherein the upper and lower molds of a multiple opening hot plate press may be opened by an amount only sufficient for venting, this amount being substantially less than the amount of full opening of each mold. Other objects and advantages will become apparent from the following specification and drawing wherein:

The single FIGURE is a fragmentary diagrammatic illustration of a multiple opening press arrangement incorporating the features of the invention.

Referring to the FIGURE, it is seen that the press includes a stationary top platen 10 which is vertically aligned with a movable bottom platen 12. Positioned between the platens 10 and 12 is a movable intermediate platen 14. The intermediate platen is provided with an upwardly facing portion 15 which together with the top platen 10 constitutes an upper mold 16 and is also provided with a downwardly facing portion 17 which together with the bottom platen constitutes a lower mold 18. It will be understood that the press is symmetrical about a vertical center line and for this reason only half of the press is shown.

The intermediate platen is supported by a pair of spaced lift cylinders 19, each of which is provided with a piston 20 which divides the cylinders into advance and return chambers 21 and 22. Each piston 20 is provided with a downwardly projecting piston rod 23 having a threaded portion 24 which adjustably carries a support nut 26. The rods 23 are received through openings 28 formed in projections 30 which extend laterally of the intermediate platen 14. The openings 28 provide sufficient clearance around the rods 23 so that the intermediate platen 14 is easily movable relatively of the rods 23 above the nuts 26. The intermediate platen is adjustably positioned on the rods 23 so that when the pistons 20 are at the extreme top of their respective strokes, the intermediate platen is spaced from the stationary top platen 10 by a very small amount, preferably, about one-quarter of an inch, this amount of opening being only that which is required for venting of the upper mold.

The movable bottom platen 12 is supported on a main ram 34, the lower end of which terminates in a piston 36 which is reciprocally received in a main cylinder 38 and which divides the latter into advance chamber 40 and return chamber 42.

The main ram 34 is provided internally thereof with a rapid advance chamber 44 which receives therein a stationary piston 46 which is fixedly secured to the main cylinder 38 or to the cylinder supporting framework. The stationary piston 46 is provided internally thereof with an opening 48 communicating with chamber 44 for a purpose to be explained hereinafter.

The remaining elements of the device and the details thereof are best described in conjunction with a description of the manner of operation of the arrangement. To start a press cycle, the operator presses a start button (not shown) energizing a solenoid 49 whereby a four-way valve 50 is positioned to deliver fluid from a source (not shown) into inlet port 51 and out through a port 52. It should be noted at this time that solenoid operated valves 54 and 62 are provided which are normally open and also that a port 58 of a solenoid operated surge valve 56 is normally open whereas a port 60 of the valve 56 is normally closed. Pressure fluid flows from port 52 through line 64, valve 54, and opening 48 into the rapid advance chamber 44. Simultaneously, fluid also flows from a reservoir 84 through the port 58 of surge valve 56 into the advance chamber 40, whereupon, the main ram is moved upwardly at a rapid rate.

Pressure fluid also flows from port 52 through line 64, line 66, line 68, valve 62, a flow control valve 70, and check valve 72 into the advance chambers 21 of the lift cylinders 19. The flow control valve 70 is preferably adjusted so that the lift cylinders raise the intermediate platen at a speed equal to approximately half the speed of the main ram until the pistons 20 reach the top of their stroke at which time the intermediate platen is spaced from the stationary top platen as explained heretofore. Fluid present in return chamber 42 is permitted to exhaust through line 76 into port 74 of valve 50 and out through port 86.

The main ram meanwhile continues moving the movable bottom platen upwardly and the motion continues until the lower mold is closed whereupon the intermediate platen is picked up by the bottom platen and is moved upwardly into contact with the stationary top platen, so that the upper mold is closed.

At the time the lower platen picks up the intermediate platen, a switch LS-2 is tripped, whereby the solenoids of valves 56 and 62 are energized. Energization of the solenoid of valve 62 closes this valve so that all of the liquid in the line above the valve is trapped therein, thereby effectively holding the lift cylinders at the top of their respective strokes. Energization of the solenoid of valve 56 causes port 58 to be closed and port 60 to be opened. High pressure fluid is now directed to both of the advance chambers 40 and 44 so that, after the upper and lower molds are closed, full pressure is built up under the main ram. It should be noted that when the molds are completely closed, the intermediate platen is positioned preferably approximately one-quarter of an inch above the adjusting nuts 26.

After a pre-set time interval, the timer 73 is actuated, whereby the solenoid of valve 54 is energized and the solenoids of valves 50 and 56 are deenergized. Deenergizing the solenoid of valve 56 opens port 58 and closes port 60. Energizing the solenoid of valve 54 closes this valve. However, it will be noted that valve 54 is conventionally arranged to permit a restrictive flow of fluid, even when in closed position, for a purpose to be explained hereinafter. Deenergizing the solenoid 49 of valve 50 permits the pressure fluid entering into port 51 to be directed from port 74 through line 76 and into the return chamber 42 of the main ram. Fluid is permitted to exhaust from chamber 40 through port 58 of valve 56 to the reservoir 84 and fluid is also permitted to exhaust from chamber 44 through the restrictive flow valve 54 then into port 52 of valve 50 and out through port 88 which thereby prevents too rapid opening of the molds. The main ram moves downward (in the present instance approximately one quarter inch) until the intermediate platen comes to rest on the adjusting nut 26 of the rod 23. The intermediate platens can descend no further because, as explained heretofore, the piston and rod of the lift cylinders 19 are held at the top of their stroke because of the trapped liquid above valve 62 and because of check valve 72.

After the main ram and bottom platen have deposited the intermediate platen on adjusting nuts 26, their motion continues until the lower mold has been opened a very slight amount for venting purposes at which time a limit switch LS–3 is tripped. Tripping limit switch LS–3 deenergizes the solenoid of valve 54 and energizes the solenoids of valves 50 and 56. Valve 54 is thereby opened and the spindle of valve 56 is shifted so that port 58 is closed and port 60 is opened. Fluid is now directed from port 52 of valve 50 to both of the advance chambers 40 and 44 in the same manner as explained earlier, so that the molds 16 and 18 are once again closed, under full pressure, for the curing portion of the cycle of operation. Fluid exhausted from return chamber 42 is directed into port 74 of valve 50 and discharged through port 86.

After a pre-set time interval, the timer 73 deenergizes valves 50, 56 and 62. Deenergizing the solenoid of valve 62 opens the valve preparatory for the next cycle. Valve 50 is shifted so that pressure fluid is directed from port 74 thereof into the return chamber 42 of the main cylinder, whereupon the main ram and movable bottom platen move downwardly toward full open position. At this time, the check valve 72 is held closed by the fluid pressure thereagainst, so that the fluid from the lift cylinder chambers 21 is forced to flow through a flow control valve 80 and check valve 82. The flow control valve 80 is preferably adjusted to permit the intermediate platen to move downwardly at a rate approximately half of the rate of the main ram, so that both molds reach full open position at approximately the same time. An additional reason for specifically controlling the rate of descent of the intermediate platen is to prevent this platen from descending at a faster rate than the bottom platen and thereby closing the lower mold. The fluid from lift cylinder chambers 21, and advance chambers 40 and 44 are permitted to enter port 52 of valve 50 and exhaust from port 88. When the main ram reaches its full open position, a limit switch LS–1 is tripped energizing a second solenoid 89 to shift the four-way valve 50 to neutral position at which time the press is ready for the next subsequent cycle of operation. The electrical sequence of operation can best be described by considering it separately instead of in conjunction with the hydraulic sequence as shown above. At the start of a cycle of operation, the operator presses a start button (not shown). The timer 73 is set to "start" position wherein contacts 90, 92 and 94 are set in closed position. A solenoid 49 of valve 50 is energized through closed contact 94 causing fluid to be delivered through port 52 as previously shown. At the same time, normally closed relay 98 is energized through the closed contacts 94 thereby de-energizing a second solenoid 89 on valve 50 that is used to hold the moving element 102 in neutral position when the solenoid is energized. Switch 104 of timer 73 is open at this time.

As the main ram 34 moves upward, section 106 of switch LS–1 opens having no effect on the circuit, since it is in series with the open relay 98. Section 108 of switch LS–1 closes energizing one of the contacts of relay 110 and also one of the contacts of relay 112. Main ram 34 actuates switch LS–3 as it moves upward, temporarily energizing normally closed relay 114 through section 116. Energizing relay 114 has no effect on the circuit at this time, since the contacts are in series with open switch 118 of timer 73. Switch 120 of timer 73 is also open at this time. The moveable contact of switch 120 is also temporarily energized through section 116 of switch LS–3. Main ram 34 continues upward and actuates switch LS–2 energizing relay 110. Upon closing of its contacts, the relay 110 will also be energized through said closed contacts, causing it to remain in an energized condition through the closed contacts of section 108 of switch LS–1 when LS–2 is subsequently opened. A timer motor 126 starts running, controlling switches 90, 92, 104, 118, 120 and 128 automatically. The motor 126 will continue to run as long as relay 110 is energized through section 108 of LS–1. The solenoid of valve 62 is energized through closed switch 92 and the solenoid of valve 56 is energized through switch 90 of timer 73. At this time, switch 128 is open.

After a preset time interval, as previously explained, the solenoid of valve 56 is de-energized by opening of switch 90. Switch 94 opens de-energizing solenoid 49 of valve 50. Simultaneously relay 98 is de-energized causing it to close; however, this has no effect on the operation at this time, since its contacts are in series with open switch section 106. Switch 118 closes energizing the solenoid of valve 54 through the closed contacts 122 and normally closed relay 114. Switches 104, 120 and 128 close simultaneously shortly after switches 90 and 94 open. As platen 34 lowers, switch LS–2 is released. Relay 110 remains energized through switch section 108 of LS–1 as previously shown. The timer motor 126 continues running and one of each of the contacts of switches 90 and 92 remains energized. As platen 34 lowers switch LS–3 is again actuated whereby the solenoid of valve 54 is de-energized. This is accomplished by the opening of switch section 122 of LS–3. The closing of section 116 energizes relay 112 through closed switch 120. When the contacts of relay 112 close, it is thereafter kept energized through the closed section 108 of LS–1. One contact of switch 104, 120 and 128 and relay 114 will remain energized subsequent to the opening of section 116 of LS–3 by being energized through the closed contacts of relay 112 and section 108 of switch LS–1. The solenoid of valve 56 is energized through closed switch 128 and the solenoid 49 of valve 50 is energized through the closed switch 104. As platen 34 again moves upward and closes, actuating switch LS–2 has no effect on the operation since it effectively shunts section 122 of switch LS–3.

After a second preset time interval, as previously explained, the timer energizes valves 50, 56 and 62. Switches 92, 94, 120, 128 and 104 are opened by the timer action. Opening of switch 92 de-energizes the solenoid of valve 62. Opening of switch 128 de-energizes the solenoid of valve 56. Opening of switch 120 de-energizes normally closed relay 114 and opening of switch 104 de-energizes normally closed relay 98 and solenoid 49 of valve 50. As the platen 34 lowers, switch LS–3 is again actuated having no effect other than temporarily actuating relay 114.

As platen 34 goes to its lowermost position, switch LS–1 is actuated. Switch section 108 opens and simultaneously de-energizes relays 112 and 110 as well as stops the timer motor 126. Closing of section 106 energizes solenoid 89 of valve 50, through normally closed relay 98, placing valve 50 in neutral position. The timer may then be turned to start position for the next cycle.

The illustrations, circuitry and valve structure are not intended to be limited to the details shown, since various modifications and structural changes can be made without departing from the spirit of the present invention.

We claim:

1. In a multiple opening press having a stationary top platen, a movable bottom platen, and an intermediate platen forming with said top and bottom platens an upper and a lower mold respectively, the combination of: fluid operated cylinders operatively associated with said intermediate platen and said movable platen, the cylinder associated with the intermediate platen having a stroke which is less than the amount of full opening of the upper mold; the intermediate platen being movable above its lower most position relative to the cylinder associated therewith; means for actuating said cylinders simultaneously to move said intermediate platen and moveable platen toward closed position and to move the intermediate platen at approximately half the rate of movement of the moveable platen; the cylinder associated with said movable platen being effective to completely close said upper and lower molds; and means for reversing the action of the last-mentioned cylinder to such extent that both molds are opened an amount only sufficient for venting.

2. In a multiple opening press; a top platen; a movable intermediate platen defining with said top platen an upper mold; a movable platen defining with said intermediate platen a lower mold; spaced lift cylinders having rods supporting said intermediate platen, said platen being movable on said rods axially thereof above its lower most position relative thereto, said rods having a stroke insufficient to close said upper mold; a main cylinder having a ram for supporting the movable platen; means for actuating said cylinders simultaneously, said ram being effective, after the lift cylinder rods have reached the end of their stroke, for supporting the intermediate platen and closing both of said molds; and means for reversing the motion of said ram to open both of said molds an amount less than full opening for venting said molds, the intermediate platen in the reversing operation being supported first by the ram and then by said rods.

3. In a multiple opening press; a top platen, a movable intermediate platen defining with said top platen an upper mold; a movable platen defining with said intermediate platen a lower mold; spaced lift cylinders having rods supporting said intermediate platen, said platen being movable with said rods axially thereof through a stroke insufficient to close said upper mold; a main cylinder having a ram for supporting said movable platen; means for actuating said cylinders simultaneously; said ram being effective to close said lower mold and to move said intermediate platen axially of said lift cylinder rods to close said upper mold; and means for reversing the action of said main cylinder and ram for opening both of said molds an amount only sufficient for venting.

4. In a multiple opening press having a top platen, an intermediate platen and a movable bottom platen together forming an upper and a lower mold: lift means for moving said intermediate platen toward the top platen to a pre-determined position without closing the upper mold; a ram for moving the bottom platen toward the intermediate platen to close the lower mold and to move the intermediate platen out of said pre-determined position to close the upper mold while said lift means are held stationary; means for reversing the movement of said ram to return said intermediate platen to said pre-determined position for venting the upper mold, and for opening the lower mold for venting purposes while the intermediate platen is held in said pre-determined position by said lift means.

5. In a multiple opening press: a top platen; a movable intermediate platen forming with said top platen an upper mold; means for lifting said intermediate platen to a pre-determined position spaced from said top platen; said lifting means accommodating movement of said intermediate platen relative thereto to closed position; a movable bottom platen forming with said intermediate platen a lower mold; means for moving said bottom platen into contact with the intermediate platen and then moving the latter relatively of said lifting means into contact with the top platen; means for reversing the movement of the bottom platen to return the intermediate platen to said pre-determined position for venting the upper mold; and means for stopping the bottom platen prior to full opening of the lower mold.

6. A method of operating a multiple opening press having a stationary top platen, an intermediate platen and a movable bottom platen, including the steps of: lifting the intermediate platen to a pre-determined position short of complete closing while moving the bottom platen toward closed position; then moving the intermediate platen to closed position by a force exerted by the bottom platen and thereby also moving the bottom platen to closed position; then reversing the movement of the bottom platen to return the intermediate platen to said pre-determined position and supporting the intermediate platen at the latter position by means other than the lifting means; then continuing the reverse movement of the bottom platen to a position less than full opening; then moving the bottom platen and thereby moving both movable platens to closed position; and then returning the movable platens to their respective starting positions.

7. An hydraulic system for operating a multiple opening hot plate press including a stationary top platen, a movable intermediate platen and a movable bottom platen, said system comprising: first fluid motor means and a first hydraulic circuit for reciprocating the intermediate platen; second fluid motor means and a second hydraulic circuit for reciprocating the bottom platen; a source of pressure fluid; valve means for supplying fluid to said first circuit for advancing said intermediate platen to a predetermined position spaced from the top platen; said valve means being effective to simultaneously supply fluid to the second circuit to advance the bottom platen at a rate approximately twice that of the intermediate platen to pick up the intermediate platen after the latter has reached its said predetermined position and move the latter into contact with the stationary top platen; valve means in the first circuit responsive to bottom platen movement for shutting off fluid flow in said first circuit; and means for reversing fluid flow in said second circuit for effecting opening of said molds an amount substantially less than full opening.

8. In a multiple opening press; a top platen; a movable intermediate platen defining with said top platen an upper mold; a movable platen defining with said intermediate platen a lower mold; spaced lift cylinders having rods slidably receivable through said intermediate platen; adjusting nuts threadably received on said rods for supporting said intermediate platen; said intermediate platen being movable with said rods through a stroke insufficient to close the upper mold; a main cylinder having a ram for supporting said movable platen; means for actuating said cylinders simultaneously; said ram being effective to close said lower mold and to move said intermediate platen axially of said lift cylinder rods to close said upper mold; and means for reversing the action of said main cylinder and ram for moving said intermediate platen into supported position on said adjusting nuts for venting said upper mold, and for opening the lower mold for venting thereof.

References Cited in the file of this patent

UNITED STATES PATENTS

| | | |
|---|---|---|
| 2,222,732 | Winegar | Nov. 26, 1940 |
| 2,338,329 | Hermanns | Jan. 4, 1944 |
| 2,375,946 | Reichelt | May 15, 1945 |
| 2,381,125 | Hermann | Aug. 7, 1945 |
| 2,586,474 | Moore | Feb. 19, 1952 |
| 2,864,127 | Marti | Dec. 16, 1958 |

FOREIGN PATENTS

| | | |
|---|---|---|
| 755,915 | Germany | Mar. 2, 1953 |